United States Patent Office 3,446,980
Patented May 27, 1969

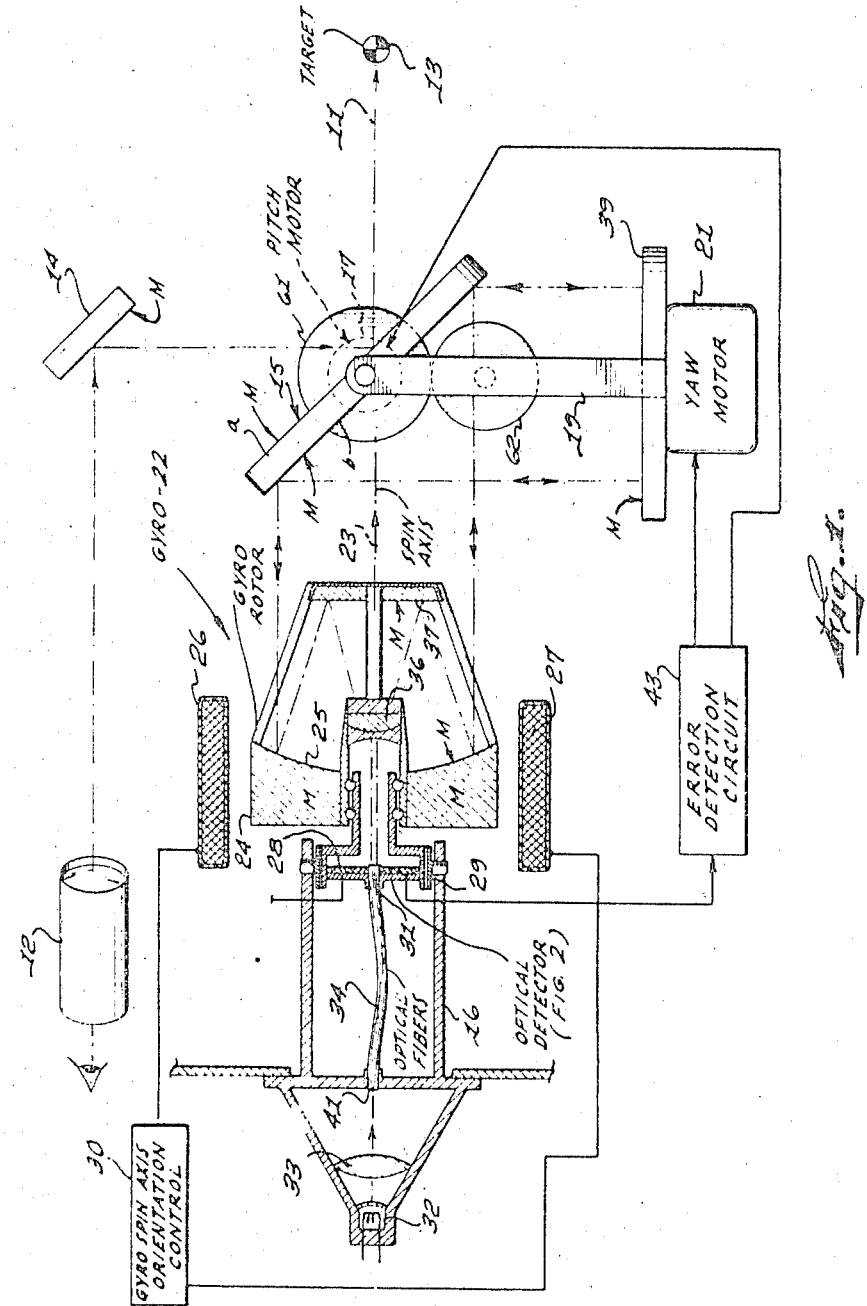

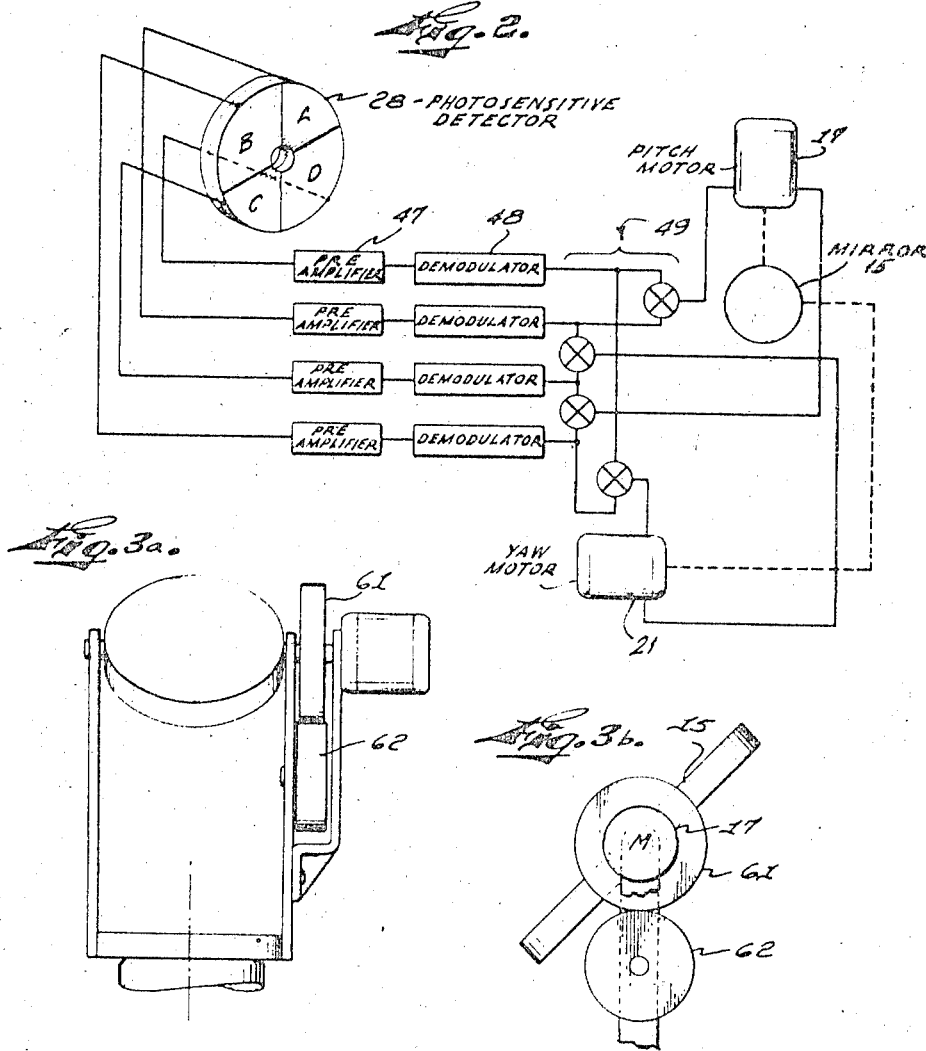

3,446,980
STABILIZED SIGHT SYSTEM EMPLOYING AUTO-
COLLIMATION OF GYRO-STABILIZED LIGHT
BEAM TO CORRECT YAW AND PITCH ORIEN-
TATION OF COUPLED SIGHT LINE AND SERVO
SYSTEM MIRRORS
Rudolf H. Meier, Tustin, Calif., assignor to Philco-
Ford Corporation, Philadelphia, Pa., a corporation of
Delaware
Filed Sept. 22, 1965, Ser. No. 489,146
Int. Cl. G01d 5/34; H01j 39/12
U.S. Cl. 250—231                                    2 Claims

ABSTRACT OF THE DISCLOSURE

Stabilized sight system employing a stabilized light beam which is reflected from an autocollimating mirror and returned to a photosensitive detector. When the orientation of the system changes, the beam is displaced from the center of the detector, producing an error signal which directs servos to rotate a second mirror to return the beam to the center of the detector. The opposite side of the second mirror is in the path of the line of sight so that the line of sight will be simultaneously retained to its original position.

---

This invention relates to optical sight systems and more particularly to a line of sight stabilizing system in which a sight line reflecting mirror is gyroscopically stabilized about azimuth and elevation axes.

Certain armament systems employ an optical sighting device such as a manually operated telescope or periscope in which a crosshair reticle is trained manually on a target. The launching or guidance system for the projectile or missile fired by the system is coordinated with the sighting system so that the missile will strike the target which is centered in the reticle. No difficulty is encountered so long as the armament system is positioned on a fixed platform.

However, in advanced armament systems of the type wherein a missile may be fired from a moving airborne vehicle or ground vehicle, it is necessary to provide motion compensation means in the sighting system for overcoming the motions of the vehicle. If, for example, the sighting device is mounted in an aircraft or tank, motions such as pitch and yaw affect the line of sight and must be compensated.

It is not practical to overcome the problems caused by vehicle motion by stabilizing the sighting means with a gyroscope or the like. This is because when a sighting system is stabilized with respect to the distant target, the eyepiece of the sight will move with respect to the moving vehicle, and hence with respect to the eye of the observer who sits in the moving vehicle. This relative motion between the observer and the eyepiece makes sighting difficult. Furthermore the inertia of the sighting system prevents exact compensation for vehicle motion and introduces some deviation between the optical axis of the sighting device and the desired target.

Prior art systems which stabilize an internal component of the sighting system, rather than the sight itself, have overcome these drawbacks but have not provided the degree of accuracy and frequency range required by present day guided missile armament systems.

Accordingly, it is an object of this invention to provide a gyroscopically-controlled line of sight stabilizing system of improved accuracy and frequency range.

The device of this invention overcomes the disadvantages of prior art devices by employing a gyroscopically-stabilized system which utilizes an optical path detection system which senses deviations of the line of sight from a gyro spin axis and which applies correction signals to the line of sight system without the use of mechanical transfer mechanisms.

Extremely accurate measurement of the deviation of the line of sight from the gyro spin axis is obtained by the optical detection system; corrections are accurately and quickly applied by means of an electrical servo to the line of sight system.

It is therefore another object of this invention to provide a gyroscopically-controlled optical sight system which utilizes optical means to detect deviations of the line of sight from the gyro spin axis.

It is still another object of this invention to provide a gyroscopically-controlled optical sight system in which the stabilizing gyro utilizes an electro-optical detector to provide signals to the optical sight system to compensate deviations in azimuth and elevation.

DRAWINGS

FIGURE 1 is a diagram in schematic and block form which illustrates a preferred embodiment of the gyro stabilized sight system of the invention.

FIGURE 2 is a schematic diagram which illustrates a detector and closed loop servo system which forms part of the system of FIGURE 1.

FIGURES 3a and 3b illustrate a system for inertial balancing of the sight line deflecting mirror.

SUMMARY

According to a principal aspect of the invention, a gyro-stabilized sight system is provided within a vehicle for maintaining the line of sight of the system in correspondence in azimuth and elevation with the spin axis of the gyro. A sight line deflecting mirror movable with respect to the vehicle has a reflecting front surface disposed in the line of sight optical system. An optical path system for measuring displacement of the line of sight from the gyro spin axis is provided which includes a source of light disposed along the gyro spin axis and an autocollimating mirror. The reflecting back surface of the sight line deflecting mirror is disposed to project a collimated beam of light from the light source onto the autocollimating mirror which reflects a return beam to an optical detector by way of the rear surface of the line of sight deflecting mirror. The detector is disposed along the gyro spin axis and is mounted on the gyro for stabilization in space. The displacement of the return beam from the gyro spin axis is measured by the stabilized detector which provides azimuth and elevation error signals indicative of the deviation of the line of sight from the gyro spin axis. Closed loop servo means responsive to these deviation signals move the sight line deflecting mirror in a direction to cause the line of sight to correspond to the gyro spin axis.

FIGURE 1

FIGURE 1 shows a stabilized line of sight system for controlling a line of sight 11 between a sighting telescope 12 and a target 13. The line of sight 11 is directed along an optical path from the telescope 12, to a reflecting mirror 14, to a sight line deflecting mirror 15, and thence to the target 13. Mirror 14 and telescope 12 are fixed to the vehicle while mirror 15 is movable with respect thereto. Mirror 15 has a reflecting front surface $a$ in the optical path of the line of sight 11 and a reflecting back surface $b$ which is parallel to front surface $a$. The sight line deflecting mirror 15 is mounted in a suitable frame which is pivoted about the elevation axis by means of a shaft (not shown) which is driven by a pitch torque motor 17. The shaft for pivoting mirror 15 is journalled on the upper portion of a gimbal ring 19 which is mounted to the vehicle and journalled therein in a conventional manner for movement about the azimuth axis. A yaw torque motor 21, which is fixed to the vehicle, rotates the gimbal ring 19 and the attached sight line deflecting mirror 15 about the azimuth axis.

The line of sight 11 is deflected by movement of sight line deflecting mirror 15 about its azimuth and elevation axes in order to stabilize the line of sight in space. This is done by means of a system including a gyroscope 22 of conventional two-axis type which provides stabilization in space about its spin axis 23. Gyroscope 22 has a housing 16 attached by suitable means to the vehicle platform. A gyro rotor 24 is mounted on gimbal means 29 so that it is free to rotate about spin axis 23. Gimbal means 29 is part of a conventional two-axis gimbal which is supported by housing 16. Rotor 24 has a primary mirror surface 25, a secondary mirror surface 37, and a negative lens assembly 36. Gyro 22 has a pair of precession coils 26 and 27 for torqueing the gyro in accordance with a control 30 which may be, for example, operated by hand by the operator to select the target 13 viewed through the telescope 12. In this manner, gyro spin axis 23 may be displaced in accordance with operator commands.

An optical light path system is provided for detecting deviations of line of sight 11 from gyro spin axis 23 in order to develop correction signals for the pitch motor 17 and yaw motor 21. The detection system includes a light detector 28 which is attached to an inner (yaw) gimbal 29 and which is stabilized by the gyro along spin axis 23.

Detector 28 is sensitive to light and comprises a plurality of separated surfaces as shown in FIG. 2. Detector 28 has a central opening 31 which passes light directed from a source 32 through a lens 33.

Light source 32 and lens 33 are fixedly attached to the gyro housing 16. Source 32 projects a light beam through an opening 41 in the housing 16 to optical fibers 34 which direct the light beam through an opening 31 to the mirror system which includes negative lens 36, secondary reflecting mirror 37, and primary mirror 25. The light beam is collimated by the mirror system and projected along axis 23 onto the back surface b of mirror 15. The collimated beam is reflected by mirror 15 onto an autocollimation mirror 39 which is attached to gimbal 19 and is movable therewith about the azimuth axis.

The return beam from the mirror 39 is again reflected by surface b of mirror 15 and is focused on detector 28 by means of mirrors 25 and 37 and lens 36. Detector 28, which is positioned to receive a slightly unfocused image, provides electrical output signals to an error detection circuit 43; these signals indicate azimuth and elevation deviations of the line of sight 11 from the gyro spin axis 23.

Circuit 43 provides signals to yaw motor 21 and pitch motor 17 which thereupon correct the orientation of mirror 15 in azimuth and elevation.

Since the front and back surfaces a and b of mirror 15 are parallel, the deviation of the light path reflected by back surface b from the beam received by detector 28 is an exact measurement of the deviation of the line of sight 11 from the gyro spin axis 23. Therefore orientation corrections of back surface b are transmitted to front surface a to correct line of sight deviations. In this manner the line of sight 11 presented to the eye of the viewer through telescope 12 corresponds to the gyro spin axis 23. Deviations of the line of sight 11 in pitch occur in a two to one ratio to deflections of the mirror 15. That is, for every degree of deviation of mirror 15, line of sight deviation is changed by two degrees.

The autocollimation technique, wherein the light beam is collimated by the optics of the gyro, projected on autocollimation mirror 39, and then returned to detector 28, provides a very high sensitivity to deviations of the line of sight 11 from the gyro spin axis 23. Any change of position of axis 23 with respect to surface b of mirror 15 is reflected as a four fold change in position of the light spot in detector 28.

The optical sight line of sight 11 may be readily displaced at the command of the operator by control 30 which torques gyro 22 by means of precession coils 26 and 27. The resultant displacement of spin axis 23 will be sensed by detector 28; mirror 15 will thereupon be controlled by the servo system to follow spin axis 23.

FIGURE 2

FIGURE 2 is a schematic diagram of detector 28 and error detection circuit 43 of FIGURE 1. Detector 28 is a quadrant detector having four separated surfaces A, B, C, and D which are sensitive to radiant energy from the autocollimated light beam described in FIG. 1. Detector 28 will sense changes in orientation of mirror 15 with respect to the gyro spin axis because detector 28 is stabilized along the spin axis and mirror 15 is attached to the vehicle. Ordinarily the reflected light beam will be coincident with the central opening in detector 28. However, vehicle motions cause the collimated light beam from the optical path detection system to be reflected from the surface b of mirror 15 at an angle which directs the returned beam to one of the quadrants A, B, C, or D (or the boundary between adjacent quadrants) which results in an output from the detector 28. Signals from each of the surfaces A, B, C, and D of detector 28 are fed to an amplitude modulation system which includes a preamplifier 47 and a demodulator 48 for each of the detector surfaces. The output of the demodulators is fed to summing means 49 which supplies a first signal to pitch motor 17. This signal is indicative of the elevation deviation of mirror 15 and therefore the deviation of line of sight axis 11 from gyro spin axis 23. Summing means 49 also supplies a second signal to yaw motor 19; this signal is indicative of the azimuth deviation of line of sight axis 11 from gyro spin axis 23. Detector 28 is placed at a slightly out of focus position so that when no deviation is encountered, the output of each of its segments will be the same and proportional to one-quarter of the energy of the light beam autocollimated on detector 28. The detection system thus operates as a nulling closed-loop servo which eliminates linearity problems inherent in position slaving devices of the type where the servo loop operates at other than a zero position of two readout devices.

The stabilization system of the invention operates over wide frequency ranges of line of sight fluctuations, for example, for fluctuations of 0 to 200 c.p.s. Sight line stabilization operates according to classical closed loop servo theory; that is, an error signal is generated and the mirror is torqued by the yaw and pitch torque motors in response to the error signal to cancel the error, thereby returning the system to a null position wherein the sight line axis will be coincident with the gyro spin axis.

FIGURES 3a AND 3b

FIGURES 3a and 3b illustrate means for balancing both statically and dynamically the stabilizing mirror 15 around each of the gimbal axes. Balancing wheels 61 and 62 are mounted on a line parallel to the yaw axis. Balancing wheel 61 is mounted on the pitch axis and is fixedly attached to the stabilizing mirror 15. Balancing wheel 62 is mounted in rolling contact with wheel 61 with bearing friction provided by thin steel crossed bands (not shown) which are connected to both whels. Wheels 61 and 62 have the same radius and hence tend to rotate through the same angle, but in opposite directions, when the vehicle platform moves through a given angle. Wheel 62 has one-third the polar moment of inertia of the combined inertia of wheel 61 and mirror 15. Since wheels 61 and 62 are mounted in rolling contact, each motion counteracts the other and stabilizing mirror 15 tends to remain fixed relative to the vehicle frame. Since wheel 61 and mirror 15 move through one-half the unity angular reference of the platform angle, torque balancing is achieved. In this manner inertial balancing of the stabilizing mirror is maintained during vehicle motions.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

I claim:
1. A sight system for stabilizing a line of sight from a point on a movable platform to a point in space, despite motion of said platform, said sight system being of the type which comprises:
  (a) means for establishing a line of sight from said point on said platform to said point in space, said means including a first mirror having reflecting front and back surfaces, said front surface being disposed in the path of said line of sight,
  (b) means including a light source and a gyroscope having a rotatable element with a reflecting surface, for providing a light beam which is directed at the back surface of said first mirror and whose position is stabilized in space along a given axis, the light from said source illuminating said reflecting surface and being reflected therefrom to said back surface of said first mirror,
  (c) detector means fixed to said platform and having a photosensitive surface divided into at least four electrically isolated regions and positioned to receive said beam after its reflection from said back surface of said first mirror and to provide a plurality of electrical outputs indicative of the position at which said beam impinges said photosensitive surface,
  (d) means, comprising yaw and pitch motors, for changing the orientation of said first mirror with respect to said platform according to the outputs of said detector means, and
  (e) a second mirror fixed to said platform and arranged to receive said light beam, after reflection from said back surface of said first mirror, and to reflect said received light beam to said back surface, said back surface then re-reflecting said beam,
  (f) said detector means having an aperture in a central portion of said photosensitive surface thereof and being positioned so that said given axis passes through said aperture and so that said photosensitive surface lies in a plane orthogonal to said given axis and receives said reflected beam.

2. A sight system for stabilizing a line of sight from a point on a movable platform to a point in space, despite motion of said platform, said sight system being of the type which comprises:
  (a) means for establishing a line of sight from said point on said platform to said point in space, said means including a first mirror having reflecting front and back surfaces, said front surface being disposed in the path of said line of sight,
  (b) means including a light source and a gyroscope having a rotatable element with a reflecting surface, for providing a light beam which is directed at the back surface of said first mirror and whose position is stabilized in space along a given axis, the light from said source illuminating said reflecting surface and being reflected therefrom to said back surface of said first mirror,
  (c) detector means fixed to said platform and having a photosensitive surface divided into at least four electrically isolated regions and positioned to receive said beam after its reflection from said back surface of said first mirror and to provide a plurality of electrical outputs indicative of the position at which said beam impinges said photosensitive surface,
  (d) means, comprising yaw and pitch motors, for changing the orientation of said first mirror with respect to said platform according to the outputs of said detector means, and
  (e) a second mirror fixed to said platform and arranged to receive said light beam, after reflection from said back surface of said first mirror, and to reflect said light beam to said back surface.
  (f) means, comprising said back surface, for directing said beam to said photosensitive surface of said detector means,
  (g) said detector means having an aperture in a central portion of said photosensitive surface thereof and being positioned so that said given axis passes through said aperture and so that said photosensitive surface lies in a plane orthogonal to said given axis.

References Cited

UNITED STATES PATENTS 2,350,303   5/1944   Fedde.
3,326,619   6/1967   Johnson et al. _____ 250—203 X ROBERT SEGAL, Primary Examiner.

U.S. Cl. X.R.

250—220, 234; 350—16